United States Patent [19]

Coles, Jr.

[11] 3,751,636

[45] Aug. 7, 1973

[54] SIGNAL TRANSITION DETECTION CIRCUIT

[75] Inventor: Herbert George Coles, Jr., West Upton, Mass.

[73] Assignee: RCA Corporation, New York, N.Y.

[22] Filed: June 1, 1972

[21] Appl. No.: 258,633

[52] U.S. Cl. .................... 235/61.11 E, 250/219 D

[51] Int. Cl. .................... G06k 7/10, E04g 17/00

[58] Field of Search ............... 235/61.11 E, 61.7 B, 235/61.7 R; 340/146.3 C, 146.3 K, 149 A; 250/219 Q, 219 D, 219 R; 307/231, 236

[56] References Cited

UNITED STATES PATENTS

| | | | |
|---|---|---|---|
| 3,659,080 | 4/1972 | Smith | 235/61.11 E |
| 3,692,983 | 9/1972 | Cucciati et al. | 235/61.11 E |
| 3,708,655 | 1/1973 | Schanne | 235/61.11 E |

*Primary Examiner*—Daryl W. Cook

*Attorney*—H. Christoffersen, Samuel Cohen et al.

[57] ABSTRACT

A circuit for detecting transitions in an alternating signal representing binary information which signal may lack uniform peaks and sharp transitions. The signal is impressed simultaneously on a delay line and at least a peak detection circuit for detecting peaks in one sense. The delayed signal and a given fraction of the signal from the peak detection circuit are impressed on a comparator circuit, the output of which is indicative of the binary value of the alternating signal at any given time.

21 Claims, 4 Drawing Figures

SIGNAL TRANSITION DETECTION CIRCUIT

BACKGROUND OF THE INVENTION

It is often important in signal processing applications to detect the times at which an alternating signal changes from a value on one side of its instantaneous direct current component to the other. If the alternating signal is symmetrical about a constant amplitude base line such as ground, the circuits for accomplishing this objective are simple. However, when the alternating signal is asymmetrical, the direct current component of the signal varies in amplitude. In this situation, the problem determining when the signal crosses its instantaneous average level (termed here the "signal transition time") is more difficult to solve. Such a problem may occur with apparatus used to optically scan labels having alternating regions, along the scan path, exhibiting two different reflectivities such as black and white. It is desired to know when the scanning equipment transitions from a scan across a region of one reflectivity to that of another. If such a transition was manifested by a sharp change in signal level from the scanning apparatus, there would be no problem. However, since the scanning apparatus scans at any one time a finite region, it will, at a transition time, be scanning an area containing both a black region and an adjoining white region so that a sharp transition signal is not produced by the scanning apparatus. Still, it would be easy to determine when a transition occurred if the white and black regions produced uniform reflectivity. Then it would only be necessary to set a fixed threshold level. Scan signal levels on one side of the threshold would be considered white by definition while scan signal levels on the other side of such a threshold would be considered black. Where, however, the white regions may not be pure white or the black regions pure black, a fixed threshold system will not be suitable.

SUMMARY OF THE INVENTION

An alternating signal is applied to a delay means for delaying the signal and a means which produces a signal which is a fraction of the peak value in one sense of the alternating signal.

The delay means and peak value signal producing means are coupled to the two inputs of a comparator which produces one of two signals depending on which of the two input means has the greater amplitude signal.

DETAILED DESCRIPTION

Figure 1:
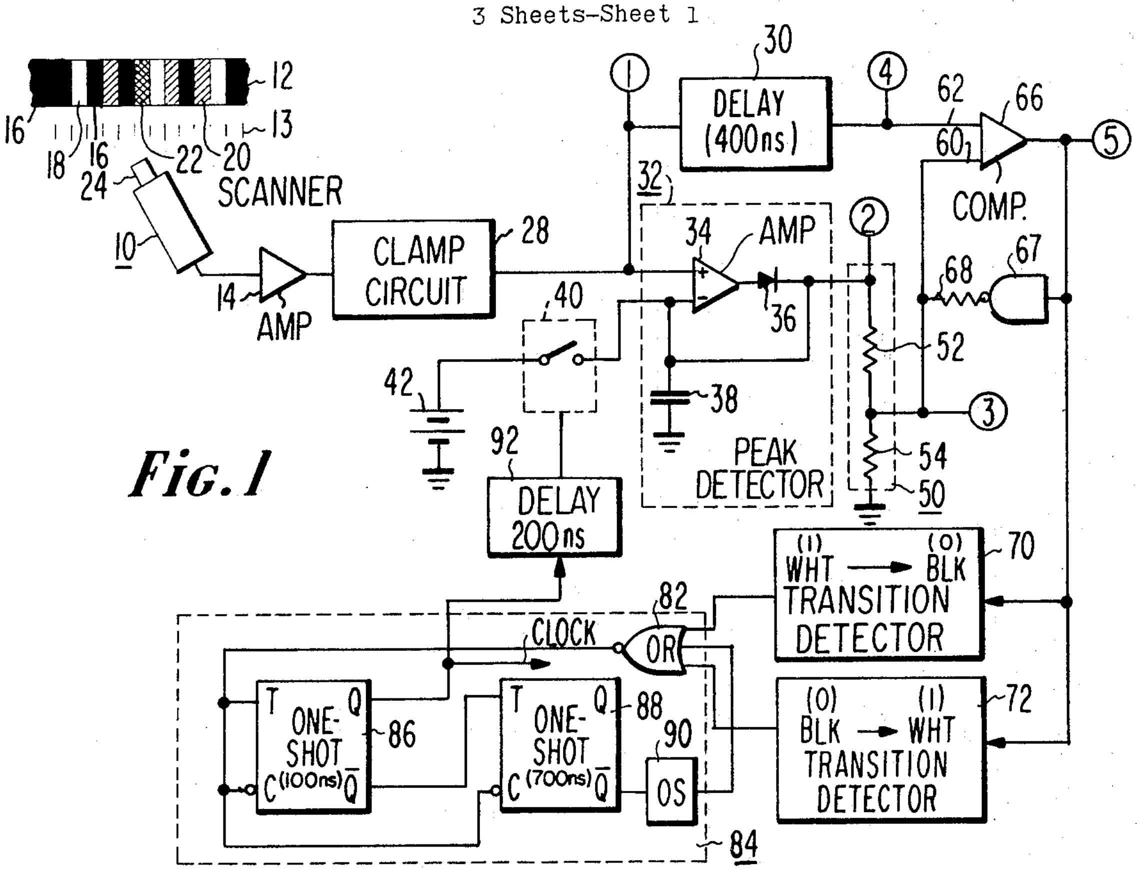
FIG. 1 is a block and schematic drawing of a signal transition detection circuit according to one embodiment of the invention.

The optical scanner 10 shown in FIG. 1 is adapted to serially scan at a constant rate a binary pattern such as 12. This pattern may be an optical pattern on a medium such as paper or some other recording material. The scanner produces electrical signals which are amplified by an amplifier 14 and which represent the reflectance of the portion of the medium being scanned. A typical scanner of this kind is illustrated and discussed in U.S. Pat. No. 3,622,758 issued to J. Schanne and assigned to the same assignee as the present invention. Scanner 10 as described herein is only a schematic representation.

The binary pattern 12 ideally is in only two colors such as black 16 and white 18, exhibiting two different levels of reflectivity. Each area is some integral multiple (including 1) along the path scanned by scanner 10. One unit width represents one bit. The tic lines 13 mark the boundaries between adjacent bits. At the constant rate at which the scanner 10 operates, the time required to scan the area of unit width is a known value chosen to be 800 nanoseconds (ns) in one working embodiment.

In practice, the pattern does not meet the ideal discussed above. Some areas 20 illustrated with diagonal lines may be soiled or smudged and exhibit less reflectivity than pure white areas 18. Other areas (one is shown at 22 as a cross-hatched pattern) may be misprinted, for example, so that they are lighter than the pure black areas 16 and therefore exhibit a somewhat higher reflectivity than the theoretical zero reflectivity of a pure black area. Further, as the scanner 10 scans an area of finite width, the area being scanned at any instant in time may be one which includes regions of more than one level of reflectivity. Thus, signal 1 (FIG. 2) produced by amplifier 14 as the scanner scans the binary pattern 12 rather than being a steep-sided two-level signal, is rounded and it is asymmetrical, varying peak-to-peak between several different levels.

The output terminal of amplifier 14 is connected to a clamp circuit 28. The purpose of this circuit is to clamp the amplifier output voltage to some fixed reference level, such as ground, in response to the scan of one of the colors, such as black. The signal from clamp circuit 28 then rises above ground while scanner 10 is scanning across white portions of the label. The output terminal of clamp circuit 28 is coupled to a delay means 30 and to a peak detector means 32. Delay means 30 delays the input signal a known amount, such as one half the time required for scanner 10 to scan across an area representing one bit which in this example would be one half of 800ns = 400ns.

Peak detector 32 comprises a differential amplifier 34 having two input terminals. The clamp circuit 28 is coupled to one of the terminals. A feedback circuit is connected between the output terminal and one input terminal of the amplifier. It includes a diode 36 which is connected at its anode to the output terminal of the amplifier and at its cathode to the second input terminal of the amplifier. Capacitor 38 is connected between the cathode of diode 36 and ground (the same reference point to which the clamp circuit 28 clamps the black level signals). An electronic switch shown shown schematically at 40 connects between a reference potential source such as a battery 42 and capacitor 38. Potential source 42 is referenced to ground.

The output terminal of the peak detector 32 is coupled to the input terminal of a voltage divider means 50. The latter, in its simplest configuration, may comprise two resistors 52 and 54 of equal value. The output terminal of divider 50 (i.e. the junction between resistors 52 and 54) is connected to one input terminal of a comparator circuit 66. The delay means 30 connects to the second input terminal 62 of the comparator circuit.

Comparator circuit 66 is of the type which produces an output signal at a first relatively low potential representing, for example, binary 0, when the signal impressed on the first terminal is at a higher level than that impressed on the second terminal, a condition which corresponds to the scanning over black or nearly black regions of the label. Comparator 66 produces an output signal at a second relatively high potential representing, in this example, binary 1, when the reverse conditions are true. A positive feedback means such as an inverter 67 and resistor 68 are series coupled between the output terminal of comparator 66 and input terminal 60.

The output of comparator 66 is coupled to two transition detector means 70 and 72. Transition detector 70 produces a short duration (about 6ns) logic 1 pulse at its output terminal when the comparator output signal changes from a level representing a 1 to a level representing a 0, while transition detector 72 produces a short duration output pulse when the reverse condition obtains.

The output terminals of transition detectors 70 and 72 are coupled to first and second input terminals of OR gate 82 in a clock signal producing circuit 84. OR gate 82, which has an inhibit output terminal, produces a logic 0 when any one or more of its input terminals is at a logic 1 and produces a logic 1 at all other times. The output terminal of OR gate 82 is connected to the Trigger (T) input terminal of a resettable one shot 86 and to the Clear (C) input terminals of one shot 86 and a similar resettable one shot 88. The Q output terminal of one shot 86 is coupled to the T terminal of one shot 88. The Q input terminal of one shot 88 is connected to a one shot 90, the output terminal of which is connected to the third input terminal of OR gate 82. One shot 90, which may be a simple R-C circuit, produces a short duration logic 1 pulse when one shot 88 becomes cleared.

One shots 86 and 88 are of the type which are normally cleared and become triggered upon receipt of the leading edge of a 1 signal at their T terminal and become cleared upon the expiration of the time specified for the one shot (i.e. 100ns for one shot 86 and 700ns for one shot 88) or upon the receipt of the leading edge of a 0 signal at their C terminal. When in the triggered condition a one shot produces a 1 signal at its Q output terminal and a 0 signal at its Q output terminal. Upon being reset, a one shot produces a 1 signal at its Q output terminal. Then the Q terminal is at the 0 level.

The CLOCK signal is coupled to a delay means 92 and te latter controls the closing of switch 40. The delay inserted by delay means 92 is chosen to be no more than one half a bit time less the width of CLOCK signal and less the time from the beginning of a scan by lense 24 across a boundary between two bits to the scan of the center of the lens across that boundary. Thus, in a practical embodiment, delay means 92 may insert a delay of the order of 200ns.

Figure 2:
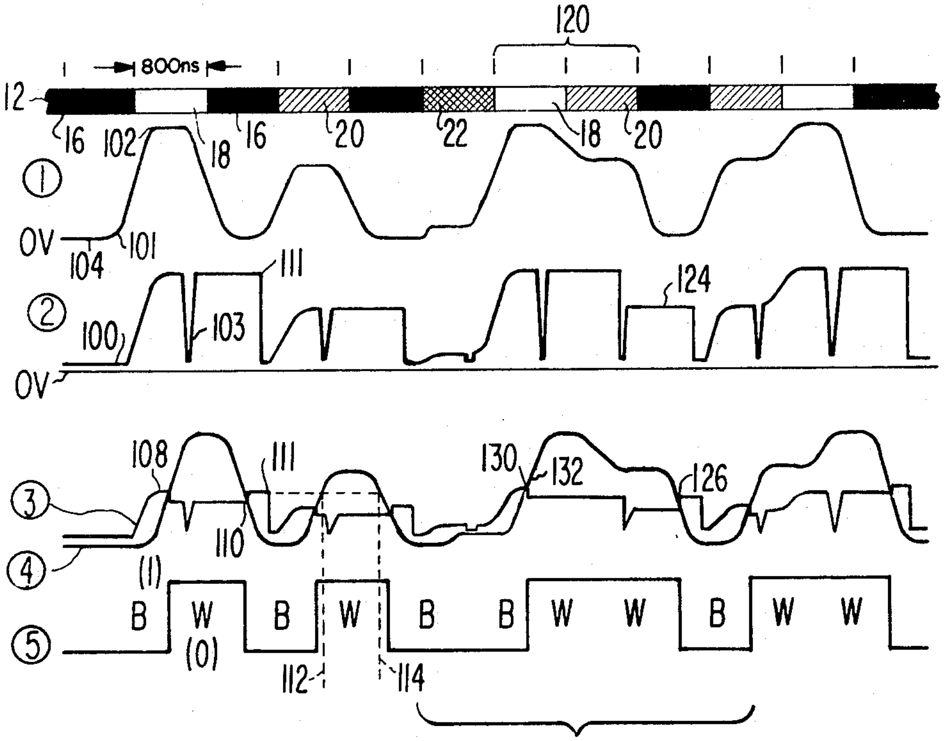
FIG. 2 is a drawing of waveforms useful for understanding the circuit of FIG. 1.

Operation of the system of FIG. 1 is best understood by referring to the waveform diagram of FIG. 2. The various waveforms are identified by encircled numbers which correspond to encircled numbers appearing at various points in the system of FIG. 1.

Scanner 10 is caused to scan across the bit pattern 12 at a constant rate of 800ns per bit. The pattern scanned is reproduced in both FIGS. 1 and 2 for convenience. Since the scanner first passes over a black region, as will be more fully brought out shortly, capacitor 38 in peak detector 32 has been discharged to the potential of source 42 as illustrated in region 100 of waveform 2, FIG. 2. Source 42 is chosen to have a potential which is slightly greater in value than the maximum potential reached by a signal at the output of clamp circuit 28 when the scanner 10 is passing over the lightest area which is still considered to be black or representative of a black bit. Then, as scanner 10 begins to scan the first white portion 18, the signal level from clamp circuit 28 begins to rise from its peak negative value (i.e. ground equivalent to black area 16). This is seen in region 101 of waveform 1, FIG. 2.

As the signal from clamp circuit 28 rises above the signal level stored in capacitor 38, the capacitor begins to charge through the path comprising amplifier 34 and diode 36.

As the scan continues across the label, the scanner reception beam soon is entirely within all white region 18. This is indicated by the peak positive portion 102 of signal 1. As indicated by signal 2, this peak value is stored in the capacitor 38. Capacitor 38 remains at the relatively high level (temporarily ignoring the dip at region 103, which will be described fully later) as signal 1 begins to decrease in value due to the passage of the beam from a white area 18 to a succeeding black area 16.

The purpose of the present circuit is to detect the actual time at which the scanner reception beam passes from a black to white level or vice versa. For purposes of the present discussion, this may be assumed to occur when the signal is half way between its lower and upper peak values, 104 and 102 respectively. The output of the peak detector 32 (i.e. the voltage present across capacitor 38) is impressed upon the voltage divider 50. The latter produces an output signal having a value one half of the signal present at its input terminal. As will be explained shortly, there is also present at this terminal a signal fed back by comparator 66 and this is the reason the signal 3 differs somewhat in shape from the signal 2, as well as differing in amplitude.

The signal from clamp circuit 28 is also delayed in delay means 30. It may be delayed by any amount of time which ensures that the scanning beam has passed from a point midway between areas of two different reflectivities to a position completely over an area of one reflectivity. In the present system, considering the finite size of the area scanned by lens 24, this is ensured by providing a 400ns delay at 30. The output of delay means 30 appears as signal 4 in FIG. 2 and is identical to signal 1 but is displaced in time by 400ns.

As comparator 66 receives input signals at its two terminals corresponding to signals labeled 3 and 4, these are superimposed one upon the other in FIG. 2. The comparator 66 is so connected that when signal 3 is higher in value than signal 4, the comparator produces a 0 output voltage which, by definition, corresponds to the receipt of a black signal, and when signal 3 is lower in value than signal 4, comparator 66 produces a 1 output level, corresponding to the scanning of a white portion of the label. The output of comparator 66 is illustrated as signal 5 in FIG. 2. Therefore, when signal 4 reaches a value midway between its lowest and highest values (i.e. its instantaneous average value), it will correspond to the highest peak value reached by signal 3.

This crossover at region 108 is marked by a change in output level of comparator 66 as indicated by signal 5.

When two input signals to a comparator are almost equal in value, as in the vicinity of region 108, there may be a tendency for the comparator output signal momentarily widely to swing between voltage levels corresponding to black and white. To eliminate such erratic behavior, the feedback circuit comprising resistor 68 is added to the circuit. When the signal level at 3 starts to cross the signal level at 4, the output signal 5 starts to swing positive. A portion of this signal, inverted by inverter 67, is subtracted from the potentiometer output signal and abruptly reduces its amplitude. This ensures that the crossover is sharp and clean. Inverter 67 is of the conventional type which upon receipt of a logic 0 produces what is termed a logic 1 which is in reality substantially an open circuit. When it receives a logic 1, it produces a low impedance negative voltage a fraction of which is subtracted from the output voltage from voltage divider 50. The amount of change of voltage in signal 3 is exaggerated in FIG. 2 to illustrate the principle. It should be noted that while the time of change of signal level from comparator 66 corresponds to a change in scanning from a black area to a white area, the time is delayed by the amount of delay in delay means 30. For example, if at time $t_0$ scanner 10 is positioned midway between the first black region 16 and first white region 18, comparator 66 will change from a black indicating level to a white indicating level 400ns later. As all of the circuitry (e.g. transition detectors 70 and 77, clock circuit 84, and other circuitry not shown) which utilizes the signal produced at comparator 66 is time coupled to comparator 66, this will present no problem.

When comparator 66 shifts from a zero to a one or from black to white, a logic 1 pulse will be produced at transition detector 72. This pulse, via OR gate 82, sets one shot 86 in clock circuit 84.

The operation of clock circuit 84 is as follows. Upon the receipt of a short-duration positive-going pulse at OR gate 82, the OR gate produces a short-duration negative-going pulse, the leading edge of which clears whichever of one shots 86 and 88 is in its triggered condition. The trailing edge (positive-going) of the pulse from OR gate 82 about 6ns later causes one shot 86 to become triggered producing a logic 1 level at its Q output terminal. At the expiration of 100ns, one shot 86 resets. Thus the clock pulse produced by stage 86 is 100ns in duration and is positive-going.

When stage 86 resets, the voltage at its Q output terminal changes from a logic 0 to a logic 1 level and this sets one shot 88. At the expiration of 700ns, one shot 88 resets. The change in voltage at Q from the logic 0 to the logic 1 level triggers one shot 90 and the short positive pulse (logic 1) it produces enables OR gate 82. The latter produces a short negative pulse which starts the clock pulse cycle over again.

The circuit continues to produce a new CLOCK signal every 800ns plus the duration of one shot 90 (a time chosen to be just slightly longer than the time for scanner 10 to scan across 1 bit) until interrupted by a logic 1 pulse from either of transition detectors 70 or 72. This pulse causes OR gate 82 to produce a negative pulse and its leading edge serves as a clear signal for whichever of the one shots is in its set condition. Successive pulses produced by the transition detectors occur at multiples of 800ns (the time required to scan an area of unit width). Therefore, such a pulse should occur while one shot 88 is in the set condition and one shot 86 is in a cleared condition and it will serve to reset one shot 88.

The trailing edge (positive-going) of the pulse from OR gate 82 sets one shot 86. This again starts the clock pulse cycle. The clock pulse starts several nanoseconds after the transition pulse from a transition detector. The transition pulse is produced 400ns after the nominal transition point, that is, it starts at the time the scanning beam is at the center of an area of unit width. Summarizing the above, each time a real transition from a black to white or white to black region occurs, then the resulting output pulse from either of transition detectors 70 or 72 will cause a 100ns CLOCK signal to be produced. This CLOCK signal starts about 400ns after the transition is detected by the scanner. Where two or more successive white bits occur, or where two or more successive black bits occur, the clock circuit 84 will produce a first CLOCK signal 400ns after a transition is detected by the scanner and a second CLOCK signal 800ns plus the duration of the pulse from one shot 90 after the start of the first CLOCK signal.

The CLOCK signal from clock circuit 84 produced as a result of the scan from the first black region 16 to the first white region 18 of binary pattern 12, delayed in delay means 92, closes electronic switch 40 for 100ns. This is ample time to permit the discharge, to the voltage level of battery 42, of capacitor 38, as illustrated at region 103 of signal 2. The amount of delay inserted by delay means 92 is chosen such that switch 40 closes while the scanner is still receiving light reflected only from the white portion of the label and just prior to the time that it begins to scan across a succeeding area of incremental width which may be a black region 16. (The 100ns clock pulse starts 400ns after a black-to-white transition. It is delayed 200ns at 92. Therefore, the switch 40 closes for the 100ns preceeding the last 100ns that the scanner is receiving light reflected from the white area of incremental width.)

The purpose of this circuit just described is to ensure that if for some reason the amount of reflectivity in a white region decreases, such as if the latter part of the region 120 (FIG. 2) becomes somehow smudged, peak detector 32 will be storing the proper positive voltage after scanner 10 begins to scan onto the following region which, as illustrated, is a black region 16. Where, as illustrated at region 103, there is no diminution of signal, no harm is done as capacitor 38 returns to its former level when switch 40 opens.

As scanner 10 continues to scan, its reception beam will reach the end of the first illustrated white region 18 (the white-to-black boundary). This condition (delayed 400ns) is illustrated as point 110 in signals 3 and 4. At this time, signal 4 becomes less negative than signal 3 causing the signal produced by comparator 66 to change from a 1 level to a 0 level as illustrated in signal 5, FIG. 2. Due to inversion in gate 67, the negative voltage is removed from feedback resistor 68 causing the voltage at terminal 66 to make a positive step which ensures that the transition will be sharp. A careful analysis of waveforms 3 and 4 will indicate that the transition from white to black will be slightly delayed due to the artificially lowered signal level of signal 3 caused by resistor 68. However, in a practical apparatus, the amount of delay will be so slight as to be negligible and can be made as negligible as necessary by decreasing the amount of feedback due to resistor 68.

When the comparator 66 output signal changes from a 1 to a 0 level, transition detector 70 produces a short output pulse which, via OR gate 82, clears one shot 88 and sets one shot 86. The resultant CLOCK signal delayed by delay means 92 causes electronic switch 40 momentarily to close discharging the peak detector as illustrated at region 111 in waveforms 2 and 3. Delay means 92 must be of sufficient duration that peak detector 32 will not be discharged while the scanner may be partially scanning across a white portion of the label. A delay of 200ns when added to the one half bit delay or 400ns delay that the signals follow the actual scan of the label is sufficient to ensure that the scanner will be fully over a black portion of the label.

As scanner 10 continues to scan, it will come across a bit 20 which, while considered white, will not produce a signal having as high an output level as was the case with white area 18 (see signal 1, FIG. 2). As previously described, this signal will be stored in peak detector 32 and half of the stored signal will be fed to comparator 66. Since the crossover between signals labeled 3 and 4 will still occur half way between the peak values reached by signal 4, the proper time of crossover is still indicated by a change in the output level of comparator 66.

If the prior art method were employed to determine the time of passage from an area of one reflectivity to an area of another reflectivity as typically exemplified by picking an arbitrary voltage to be the assumed crossover point such as a voltage midway between levels 102 and 104, the assumed crossover points would be as shown by dotted lines 112 and 114. That is, a change from a 0 to a 1 as indicated by signal 5, FIG. 2, would occur later at a time corresponding to dotted line 112 while a change from a 1 to a 0 would be advanced from the actual time to come at a time corresponding to dotted line 114.

In region 120 of the label (see FIG. 2) the scanner passes over what are nominally two white bits. However, the right portion 20 is illustrated as producing less reflectivity than the left portion 18. This may be due to a smudge on the label or some other reason. The line of demarcation will probably not be as sharp, as indicated in FIG. 2. As described previously, the CLOCK signal which occurs at approximately 400ns after the transition from the white region 18 to the smudged region 20, is delayed an additional 200ns by delay means 92 and then resets peak detector 32. At the time the reset occurs, however, the scanner 10 is scanning across a region of lesser reflectivity than is indicated by the signal previously stored in peak detector 32. As a result of the reset, the peak detector now stores the new lower value as illustrated in signal 2, region 124. As indicated by signals 3 and 4, when the delayed signal 4 crosses the voltage divided signal from peak detector 32 at point 126, the comparator changes state at the proper time.

In summary then, the circuit of FIG. 1 accurately detects the time of crossing between an area of a first reflectivity and an area of a second reflectivity even when one of those reflectivities may vary slightly due, for example, to smudging or any one of a number of other reasons. The disclosed circuit works even when the reflectivity changes in immediate adjacent areas such as, for example, in the vicinity of region 120 (see FIG. 2).

In many practical applications, the reflectivity which is assumed to change value such as, for example, the white reflectivity, may be in fact constant on any particular item being read but may vary from item to item. This may happen, for example, with labels some of which are printed on a pure white stock and others of which are printed on nominally white material, but which may in fact be quite gray such as, for example, news print. In such a case where reflectivity on a given label will not change, some of the circuitry in FIG. 1, namely clock circuit 84 and transition detector 72, may be eliminated. Then, transition detector 70 is coupled directly to delay means 92 and altered to produce a signal sufficient in width to ensure the discharge of capacitor 38.

In the circuits discussed above, the signal from clamp circuit 28 may first be peak detected in peak detector 32 and then voltage divided in divider 50 or may first be voltage divided and then the peak of that divided voltage is detected. The important point is that the average value of signal 1 while scanning from a black area 16 to a white area such as 18 or 20 be produced at terminal 6 of comparator 66. The voltage division selected (i.e. one half) could be set as some other value, if desired. Some scanner apparatus tested in conjunction with the described device caused the black signals to appear wider than they in fact were. For example, as the scanner began to scan from a black region 16 to an adjacent white region, the scanner still produced a signal indicative of passage over a black region causing the transition of signal 5 to occur later than it should. Similarly, white to black transitions would occur too early. Thus, by increasing the voltage division to greater than one half the transitions (i.e. crossover of signals 3 and 4) occurred earlier in black to white transitions and later in white to black transitions, thereby compensating for the scanning apparatus. Clearly the various times stated for scanning and for the various delays and one shots are illustrative only, actual numbers being dictated by the shape and timing of waveform 1.

Yet another problem may occur in that the black areas on the label may in fact not be pure black. Thus, for example, region 22 (see FIG. 2) is intended to be black but in fact, due to any one of a number of problems, for example, poor inking, may in fact have come out lighter than intended. When such a condition occurs, the crossover of signals 3 and 4 (FIG. 2) occurs at the wrong time, that is it occurs at the time designated 130 rather than at the correct time designated 132 (i.e. halfway between the voltage level corresponding to the scan at region 22 and that corresponding to the scan at the following region 18).

Figure 3:
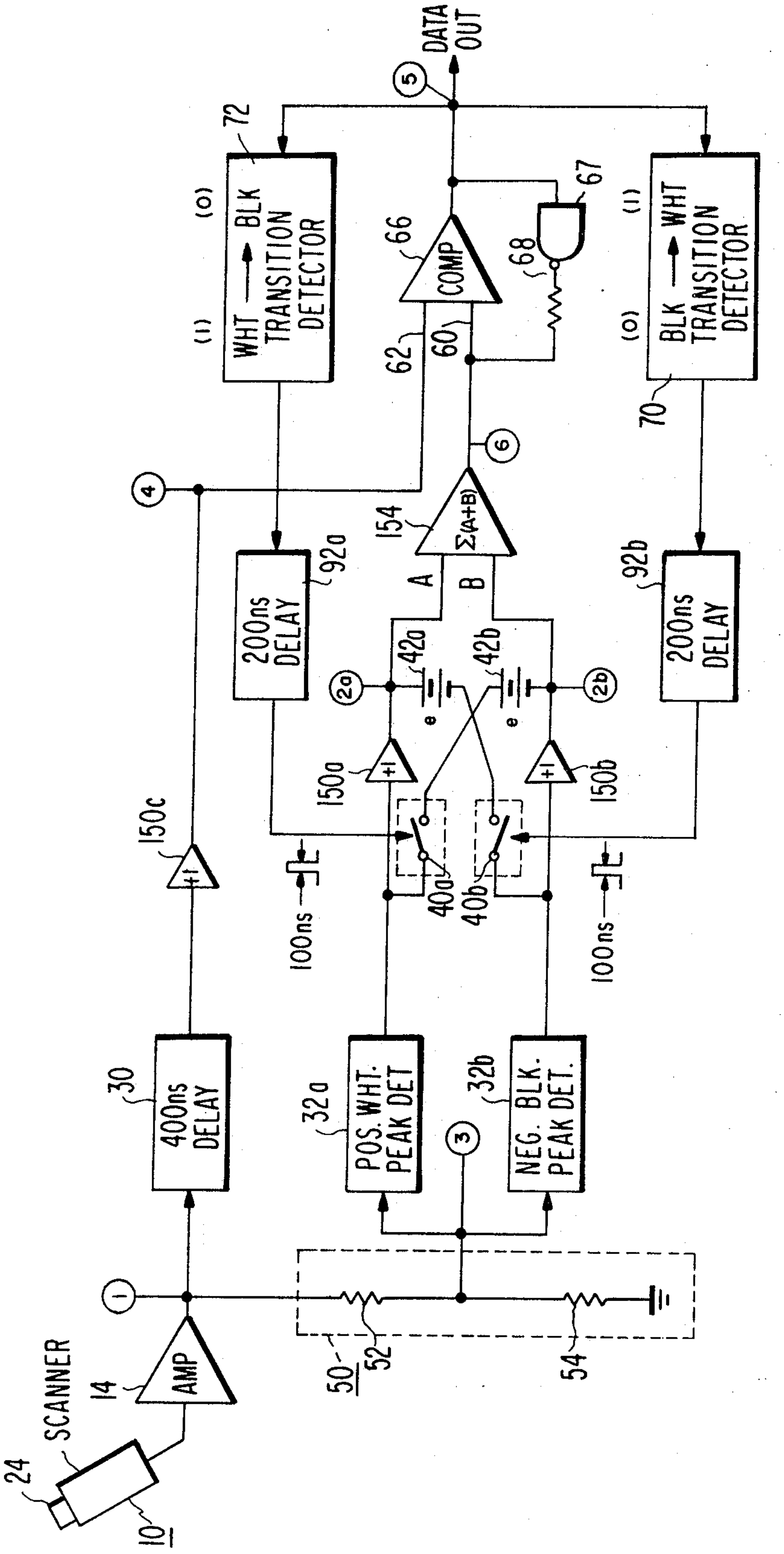
FIG. 3 is a block and schematic drawing of another signal transition detecting circuit.

The circuit of FIG. 3 is designed to compensate for variations in the black signal output as well as variations in the white signal output. It is similar in many respects to the circuit of FIG. 1 and elements common to the two circuits bear the same numbers. Thus, a scanning assembly 10 is coupled to an amplifier 14. The output of amplifier 14 is coupled to a 400ns delay 30 and to an averaging network comprising a voltage divider 50, two peak detectors 32*a* and 32*b* and a summing amplifier 54. Voltage divider network 50 comprises resistors 52 and 54, which may be of equal value. The voltage divided output from voltage divider 50 is coupled to a positive (white) peak detector 32*a* and to a negative (black) peak detector 32*b*. Peak detector 32*a* is identical to peak detector 32 (FIG. 1). Peak detector 32*b* is identical except that diode 36 is reversed from the position shown in FIG. 1. The output of peak detector 32*a* is coupled through an isolation network 150*a* which may be an emitter follower circuit exhibiting a low impedance output of the same polarity as the high impedance input from peak detector 32*a*. Isolation network 150*a* is coupled to a first input of a summing amplifier 154. Similarly, peak detector 32*b* is coupled through an isolation circuit 150*b* to a second input of summing amplifier 154. The purpose of summing amplifier 154 is to produce, at its output, the algebraic addition of the signal levels exhibited by the two peak detectors 32*a* and 32*b* respectively. Summing amplifier 154 is coupled to a first input 60 of comparator 66 while the output terminal of delay 30 via isolation network 150*c* is coupled to a second input terminal 62 of the comparator. Positive feedback resistor 68 and inverter 67 are series coupled between the output of comparator 66 and input terminal 60.

The output of comparator 66 is also coupled to two transition detectors 70 and 72. Transition detector 72 is coupled to a 200ns delay 92*a* the output of which is coupled to control the closure of switch 40*a*. Likewise, transition detector 70 is coupled to delay 92*b* while the output terminal of that delay is coupled to control the closing of electronic switch 40*b*.

A battery 42*a* having a potential difference of *e* volts and electronic switch 40*b* are series coupled between the output of amplifier 150*a* and the output of peak detector 32*b*. Similarly, a battery 42*b* and electronic switch 40*b* are coupled between the output of amplifier 150*b* and the output of peak detector 32*a*.

Figure 4:
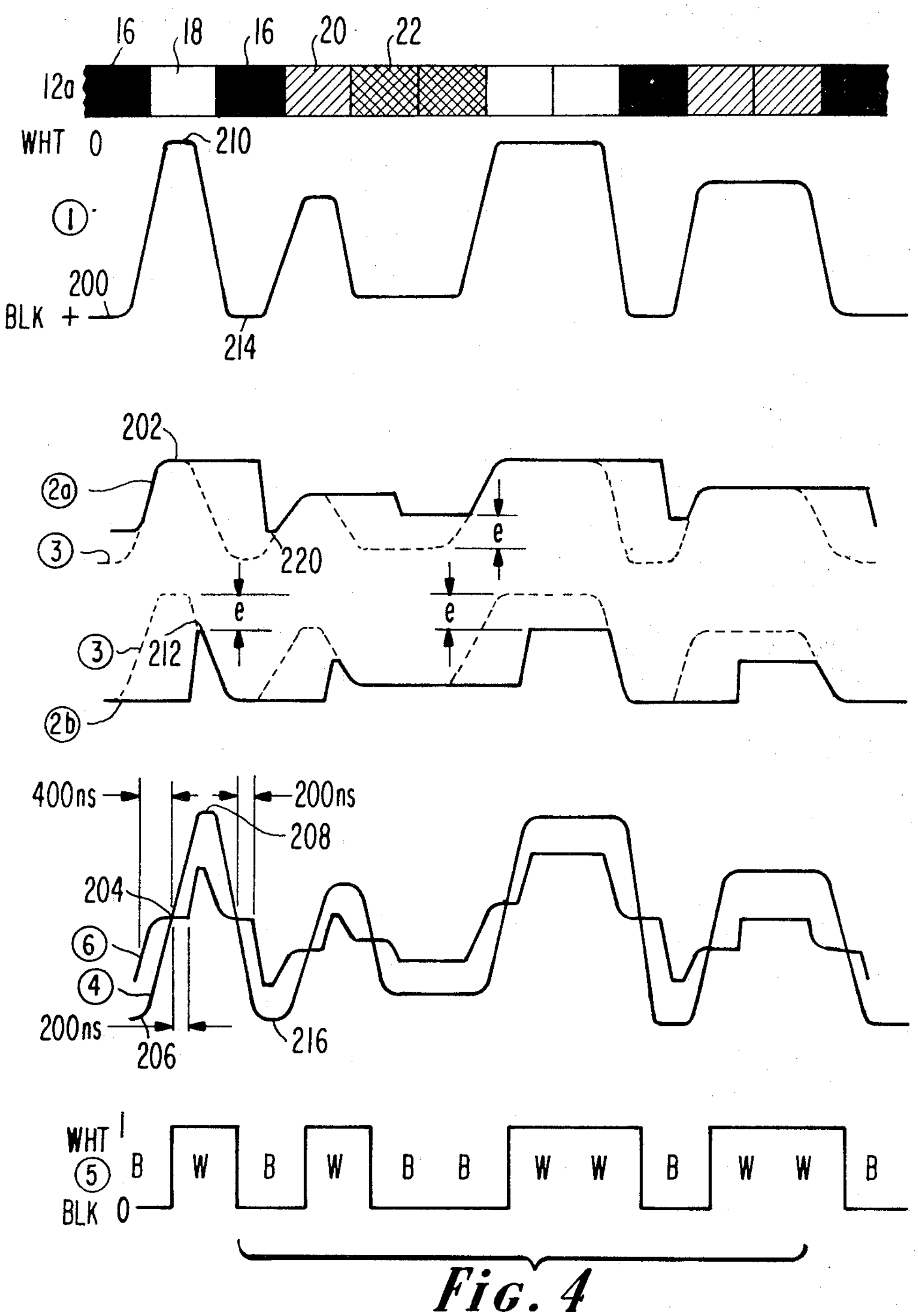
FIG. 4 is a drawing of waveforms useful for understanding the circuit of FIG. 3.

The operation of the system of FIG. 3 is best understood by referring to the waveform diagram of FIG. 4 where the various waveforms are identified by encircled numbers corresponding to encircled numbers appearing at various points in the system of FIG. 3. Waveform 1 represents the output of amplifier 14 as scanner 10 scans across a binary pattern such as 12*a*. This pattern, as was true of the pattern of FIG. 2, consists of pure black region 16, pure white region 18, regions with somewhat less reflectivity than those of pure white regions such as 20 (hereafter denoted "light gray") and regions 22 with some reflectivity other than the zero reflectivity which is expected to be experienced from region 16 (hereafter denoted "dark gray"). Assume then that peak detector 32*b* is storing one half the negative peak 200 of waveform 1 corresponding to a scan across the first region 16 of binary pattern 12*a*. Further assume that peak detector 32*a* has been discharged to a level which is *e* volts above the voltage level stored in peak detector 32*b*. The method of accomplishing this step will be described shortly. Then as waveform 1 rises to 2*e* volts above its peak negative value legended 200 (i.e. signal 3 rises *e* volts above its negative value), the capacitor in peak detector 32*a* begins to charge. Peak detector 32*a* continues to charge until scanner 10 scans across the center portion of the first region 18 of binary pattern 12*a* as legended 210 in waveform 1 and 202 in waveform 2*a*. In region 202 of waveform 2*a*, peak detector 32*a* is storing one half the positive peak value of the signal of waveform 1 while peak detector 32*b* is storing one half the negative peak as illustrated in region 200 of waveform 1. Therefore, the sum of the outputs of the two peak detectors (i.e. the output of summing amplifier 154) is the average of waveform 1 in the vicinity of regions 200–210. At position 204 of waveform 4, that waveform crosses (i.e. rises above) waveform 6 which is the combined outputs of the two peak detectors 32*a* and 32*b* respectively. The crossover occurs at the midpoint between the negative peak of waveform 4 legended 206 and the positive peak legended 208. At the time corresponding to location 204, comparator 66 changes from an output condition of a logic 0 to an output condition of a logic 1. As was true of the circuit of FIG. 1, resistor 68 somewhat lowers the value of signal 6 but this is not illustrated in FIG. 4 for purposes of clarity.

As a result of the transition from comparator 66 from a 0 to a 1, transition detector 70 produces a 100ns logic 1 pulse. This pulse, after being delayed 200ns, causes switch 40*b* to close for 100ns. When the switch is closed, peak detector 32*b* is forced to a voltage level which is *e* volts below the valve contained in peak detector 32*a* or *e* volts below one half of the positive peak value of signal 1 in the vicinity of region 210. This is illustrated as region 212 of signal 2*b*. The voltage levels at the output of the two peak detectors are kept *e* volts apart so the sum of the two will not equal (in a positive or negative sense) the peak value of waveform 1. If this were to occur, a false crossover between waveforms 4 and 6 would occur producing a false transition.

As scanner 10 continues to scan, it will scan the second black region 16. Once the voltage from amplifier 14 decreases 2*e* volts below its peak positive value (i.e. voltage 3 decreases *e* volts below the value stored in peak detector 32*a*), peak detector 32*b* begins to follow the one half the voltage level of waveform 1 as it approaches its peak negative value in the vicinity of region 214. Then when waveform 4 passes half way from its peak positive value 208 to its peak negative value 216, a crossover will once again occur between the two inputs to comparator 66. Therefore, the output of comparator 66 will shift from a logic 1 to a logic 0 and will trigger transition detector 72 to produce a 100ns pulse. This pulse, delayed by 200ns in delay 92*a*, will cause switch 40*a* to close and will cause peak detector 32*a* to be discharged to within *e* volts of the value stored in peak detector 32*b*. This is illustrated in region 220 of waveform 2*a*.

In a like manner, the apparatus of FIG. 3 performs properly with signals transitioning from black regions 16 to light gray regions 20, from light gray regions 20 to dark gray regions 22 and all other combinations of white, black, light gray and dark gray regions as is illustrated in the waveforms of FIG. 4. As was true of the circuit of FIG. 1, voltage divider network 50 may be positioned as shown in FIG. 3 or may be positioned between the output of summing amplifier 154 and comparator input terminal 60. The combination of summing amplifier 154 and voltage divider 50 act as an averaging means for averaging successive scanned signal peaks. Here, as in the circuit of FIG. 1, because of problems with scanner optics, it may be desirable to have a voltage divider which divider by other than two.

Also, circuitry may be added to momentarily discharge one or the other peak detector during each bit time so that the peak detectors will be storing current information relative to the amount of reflectivity of the area being scanned. This circuitry will be similar to that illustrated in FIG. 1 but with the ability to discharge peak detector 32*a* when scanning over white or light gray areas and to discharge peak detector 32*b* when scanning over black or dark gray areas.

What is claimed is:

1. In combination:

delay means responsive to an alternating input signal for delaying said signal;

means including a peak amplitude detection means and energy divider means also responsive to said alternating input signal for producing a signal whose peak value is equal to a fraction of the peak value in one sense of said alternating signal; and comparator means responsive to the signals produced by the delay means and the second-named means for producing a signal at a first level when the amplitude of the delay means signal exceeds that of the other signal and for producing a signal at a second, different level when the inverse is true.

2. The combination as set forth in claim 1 wherein the transitions of said alternating signals occur at integral multiples of some value, X, and wherein said delay means comprises means for delaying said signal substantially one half X.

3. The combination as set forth in claim 1 wherein said peak detection means is a resettable peak detection means, and further including means responsive to the transitions in said alternating signal from the sense detected by said peak detection means to the opposite sense for resetting said peak detection means.

4. The combination as set forth in claim 3, further including means for resetting said peak detection means to a value intermediate the opposite extremes of said alternating signal.

5. The combination as set forth in claim 1, further including means responsive to said first level signal from said comparator means for causing the delay means signal to exceed the other signal by a greater amount than if this means were absent.

6. The combination as set forth in claim 1 wherein said means including a peak amplifier detection means and energy divider means comprises a peak amplitude detection means responsive to said alternating input signal for producing a signal whose peak value corresponds to the peak value in one sense of said alternating signal and further comprises an amplitude divider means responsive to the signal from said peak detection means for producing a signal having a value which is a fraction of the signal produced by said peak detection means.

7. In combination:

means producing an alternating signal the peaks of which may be of nonuniform amplitude;

means responsive to said signal for producing a signal whose peak value corresponds to a peak in one sense of said alternating signal;

means also responsive to said alternating signal for producing a signal whose peak value corresponds to the next succeeding peak in the opposite sense from that represented by said last-named means;

averaging means responsive to the signals from said last two named means for producing a signal having a value which is the average of those two signals;

delay means responsive to said alternating signal for delaying it; and comparator means responsive to said delayed signal and said averaged signal for producing a signal at a first level when the amplitude of the delay means signal exceeds that of the other signal and for producing a signal at a second different level when the inverse is true.

8. In combination:

means producing an alternating signal the peaks of which may be of nonuniform amplitude;

amplitude divider means responsive to said signal for producing a signal having a value which is a fraction of the alternating signal;

means responsive to said divider means signal for producing a signal whose peak value is equal to a peak in one sense produced by said divider means;

means also responsive to said divider means signal for producing a signal whose peak value is equal to the next succeeding peak from said voltage divider means in the opposite sense from that represented by said last-named means;

summing means responsive to the signal from said last two named means for producing a signal which is the sum of those two signals;

delay means responsive to said alternating signal for delaying it; and comparator means responsive to said delayed signal and said summed signal for producing a signal at a first level when the amplitude of the delay means signal exceeds that of the other signal and for producing a signal at a second different level when the inverse is true.

9. An arrangement for detecting the times at which an asymmetrical alternating signal changes from a value on one side of a variable threshold level to a value on the other side of this threshold level, where the threshold level is dependent on the varying peak amplitude of the alternating signal comprising, in combination:

means for producing an attenuated, peak detected version of said alternating signal on said one side of said variable threshold level;

means for delaying the alternating signal relatively to the attenuated peak detected signal; and means receptive of the relatively delayed alternating signal and the attenuated peak detected signal for producing an output signal each time the amplitude level of one of the signals crosses that of the other.

10. The combination as set forth in claim 9 further including means for resetting the attenuated peak detected signal producing means to a reference value at least when said alternating signal goes to said other side of said threshold level.

11. The combination as set forth in claim 9 wherein said means producing an attenuated peak detected version of said alternating signal comprises means for peak detecting the alternating signal and means for attenuating the peak detected alternating signal to a given percentage of its value.

12. The combination as set forth in claim 9 wherein said means producing an attenuated peak detected version of said alternating signal comprises means for attenuating the alternating signal to a given percentage of its value and means for peak detecting the attenuated signal.

13. Apparatus for reading binary encoded information in the form of alternating regions of indicia exhibiting two different reflectivities representative of binary information comprising, in combination:

optical scanning means producing an alternating signal the amplitude of which corresponds to the reflectivity of the information being scanned;

means producing an attenuated peak detected version of said alternating signal;

means for delaying the alternating signal relative to the attenuated signal; and means receptive of the delayed signal and the alternating signal for producing an output signal indicative of which of said two received signals is the greater amplitude.

14. The combination as set forth in claim 13 wherein said binary encoded information is in the form of regions of two basic colors exhibiting substantially two different reflectivities, the dimension of each region along the scan path being an integral multiple of a unit dimension and wherein said optical scanning means includes means for scanning at a fixed rate along said scan path.

15. The combination as set forth in claim 14 wherein said delaying means includes means for delaying said alternating signal a time equal to a fraction of the time required to scan said unit dimension.

16. The combination as set forth in claim 15 wherein said means receptive of said delayed and attenuated signals includes means for producing a signal at a first level corresponding to a scan of one of said two basic colors when the amplitude of said delayed signal exceeds said attenuated signal and producing a signal at a second level when the reverse conditions are true, the leading edge of each of said levels being delayed from the time of scan across a boundary between said two colors by the amount of delay in said delay means.

17. The combination as set forth in claim 16 further including means responsive to a change in the level in one sense of the two level signal for resetting to a reference level the means producing the attenuated, peak detected version of said alternating signal.

18. Apparatus for reading binary indicia in the form of regions of alternating colors exhibiting two substantially different reflectivities comprising, in combination:

optical scanning means producing a signal the amplitude of which corresponds at any point in time to the reflectivity of the region being scanned each region along the scan path being greater than a given width;

means producing a signal which is the average of the signal produced by said scanning means while scanning two adjacent regions exhibiting substantially different reflectivity;

delay means for delaying the optical scanning signal relative to the averaged signal by an amount which is a fraction of the time required by said scanner to scan said given width; and means receptive of the delayed signal and the averaged signal for producing an output signal the value of which is indicative of which of the two input signals has the greater amplitude, whereby when the averaged signal has the greater amplitude the value of the output signal corresponds to a scan over a region of one reflectivity while when the delayed signal has the greater amplitude, a scan over a region of the other reflectivity is indicated, the leading edge of each value of the signal being delayed from the time of actual scan by the amount of delay in said delay means.

19. The combination as set forth in claim 18 wherein said averaging means comprises attenuating means producing a signal which is substantially one half of the optical scanning means signal, first peak detecting means receptive of said attenuated signal for producing a signal corresponding to peaks of the attenuated signal corresponding to a scan of a region of one reflectivity, a second signal peak detecting means for producing a signal corresponding to a scan of a region of the other reflectivity and a summing means which produces a signal which is the sum of the signals from said two peak detecting means.

20. The combination as set forth in claim 18 wherein said averaging means comprises a first peak detection means responsive to said signal from said optical scanning means for producing a signal which is receptive of the peak amplitude of said optical scanning means signal while scanning a region of one reflectivity, the second peak detection means for producing a signal receptive of the peak signal in the opposite sense while scanning regions of said other reflectivity, summing means receptive of the signals from both peak detection means for producing a signal which is a sum of those two signals and attenuation means producing a signal which is substantially one half of said summed signal.

21. The combination as set forth in claim 19 further including means for resetting one of the peak detection means to within a given magnitude of the signal level in the other peak detection means in response to said output signal changing from a value corresponding to a scan over a region of the reflectivity the optical scanning signal value of which is stored in said one of the peak detection means to the other value.

* * * * *